(12) United States Patent
Böckem

(10) Patent No.: US 9,322,654 B2
(45) Date of Patent: Apr. 26, 2016

(54) LASER TRACKER WITH A TARGET SENSING UNIT FOR TARGET TRACKING AND ORIENTATION DETECTION

(71) Applicant: Leica Geosystems AG, Heerbrugg (CH)

(72) Inventor: Burkhard Böckem, Rieden AG (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 102 days.

(21) Appl. No.: 14/274,530

(22) Filed: May 9, 2014

(65) Prior Publication Data

US 2014/0373369 A1   Dec. 25, 2014

(30) Foreign Application Priority Data

May 10, 2013   (EP) ..................................... 13167256

(51) Int. Cl.
  *G01C 15/06*    (2006.01)
  *G01C 15/00*    (2006.01)
  (Continued)

(52) U.S. Cl.
  CPC ............... *G01C 15/002* (2013.01); *G01S 17/06* (2013.01); *G01S 17/66* (2013.01)

(58) Field of Classification Search
  CPC .... G01C 15/002; G01C 15/02; G01C 15/006; G01C 15/004; G01C 15/06; G01B 11/272; G01B 11/2755; G01B 11/002; G01S 17/06; G01S 17/66
  USPC .................... 33/286, 1 CC, 203.18, 293, 288; 356/622, 614, 620
  See application file for complete search history.

(56) References Cited

U.S. PATENT DOCUMENTS

| | | | | |
|---|---|---|---|---|
| 4,343,550 A | * | 8/1982 | Buckley | G01C 15/02 248/480 |
| 5,724,128 A | * | 3/1998 | January | G01B 11/275 33/203.18 |
| 5,973,788 A | * | 10/1999 | Pettersen | G01S 5/163 356/614 |

(Continued)

FOREIGN PATENT DOCUMENTS

| | | |
|---|---|---|
| EP | 2 008 120 B1 | 12/2008 |
| EP | 2 071 282 A2 | 6/2009 |

(Continued)

OTHER PUBLICATIONS

European Search Report dated Oct. 11, 2013 as received in Application No. 13 16 7256.0.

(Continued)

*Primary Examiner* — Christopher Fulton
(74) *Attorney, Agent, or Firm* — Maschoff Brennan

(57) ABSTRACT

Embodiments of the invention relates to a laser tracker for determining the position of an auxiliary measuring instrument that has a retroreflector and a multiplicity of target markings, and also for continuously tracking the auxiliary measuring instrument. The target markings may be arranged in a known fixed spatial distribution on the auxiliary measuring instrument and may be embodied to emit or reflect light beams. The laser tracker may have a first radiation source for producing measurement radiation, a distance measuring module, and a target sensing unit for determining an impingement point for radiation reflected by the retroreflector on a sensor of the target sensing unit and for producing an output signal in order to control a fine targeting functionality and a target tracking functionality.

16 Claims, 7 Drawing Sheets

(51) Int. Cl.
*G01S 17/66* (2006.01)
*G01S 17/06* (2006.01)

(56) References Cited

U.S. PATENT DOCUMENTS

| | | | | |
|---|---|---|---|---|
| 6,675,122 | B1 * | 1/2004 | Markendorf | G01C 15/002 356/614 |
| 7,180,607 | B2 * | 2/2007 | Kyle | G01S 5/163 356/243.1 |
| 7,342,669 | B2 * | 3/2008 | Kawasaki | G01B 11/002 356/602 |
| 7,728,963 | B2 * | 6/2010 | Kirschner | G01C 15/00 356/141.2 |
| 7,861,426 | B2 | 1/2011 | Juesten et al. | |
| 7,952,728 | B2 * | 5/2011 | Ibach | B25J 9/1692 356/614 |
| 8,681,317 | B2 * | 3/2014 | Moser | G01S 17/66 356/3.01 |
| 2012/0236320 | A1 | 9/2012 | Steffey et al. | |

FOREIGN PATENT DOCUMENTS

| | | |
|---|---|---|
| WO | 92/07233 A1 | 4/1992 |
| WO | 2007/079600 A1 | 7/2007 |
| WO | 2010/148525 A1 | 12/2010 |

OTHER PUBLICATIONS

"Leica Absolute Tracker AT901," Hexagon Metrology, pp. 1-12 (2012).

* cited by examiner

LASER TRACKER WITH A TARGET SENSING UNIT FOR TARGET TRACKING AND ORIENTATION DETECTION

FIELD OF THE INVENTION

The present invention relates to a laser tracker and to a method for determining the position of and continuously tracking an auxiliary measuring instrument.

BACKGROUND

Measuring apparatuses that are designed for continuously tracking a target point and coordinatively determining the position of this point can generally be combined under the term laser tracker, particularly in connection with industrial surveying. In this case, a target point may be represented by a retroreflective unit (e.g. cube prism) that is targeted using an optical measurement beam from the measuring apparatus, particularly a laser beam. The laser beam is reflected back to the measuring apparatus in a parallel manner, the reflected beam being sensed using a sensing unit of the apparatus. In this context, an emission direction and a reception direction for the beam are ascertained, for example by means of sensors for angle measurement that are associated with a deflection mirror or a targeting unit of the system. In addition, with the sensing of the beam, a distance from the measuring apparatus to the target point is ascertained, e.g. by means of propagation time measurement or phase difference measurement.

In addition, laser trackers according to the prior art may be embodied with an optical image capture unit with a two-dimensional, light-sensitive array, e.g. a CCD or CID camera or a camera based on a CMOS array, or with a pixel array sensor and with an image processing unit. In this case, the laser tracker and the camera may be mounted in particular one on top of the other such that their positions relative to one another cannot be altered. By way of example, the camera is arranged so as to be able to rotate together with the laser tracker about the essentially perpendicular axis of the latter, but so as to be able to be pivoted up and down independently of the laser tracker and hence so as to be separate from the optical system of the laser beam, in particular. In addition, the camera may—e.g. on the basis of the respective application—be embodied so as to be able to be pivoted about only one axis. In alternative embodiments, the camera may be installed in an integrated design together with the laser optical system in a common housing.

With the capture and evaluation of an image—by means of an image capture and image processing unit—of what is known as an auxiliary measuring instrument with markings whose relative location with respect to one another is known, it is possible to deduce an orientation for an object (e.g. a probe) arranged on the auxiliary measuring instrument in space. Together with the determined spatial position of the target point, it is furthermore possible to precisely determine the position and orientation of the object in space absolutely and/or relative to the laser tracker.

Such auxiliary measuring instruments can be embodied by what are known as contact sensing tools that are positioned with their contact point on a point of the target object. The contact sensing tool has markings, e.g. light points, and a reflector, which represents a target point on the contact sensing tool and can be targeted using the laser beam from the tracker, the positions of the markings and of the reflector relative to the contact point of the contact sensing tool being precisely known. In a manner known to a person skilled in the art, the auxiliary measuring instrument may also be a, for example handheld, scanner equipped for distance measurement for contactless surface surveying operations, the direction and position of the scanner measurement beam used for the distance measurement relative to the light points and reflectors that are arranged on the scanner being precisely known. Such a scanner is described in EP 0 553 266, for example.

For distance measurement, laser trackers in the prior art have at least one distance measuring device, said distance measuring device possibly being in the form of an interferometer, for example. Since such distance measuring units can measure only relative distance changes, what are known as absolute distance measuring devices are installed in today's laser trackers in addition to interferometers. By way of example, such a combination of measuring means for distance determination is known by means of the product AT901 from Leica Geosystems AG. The interferometers used for the distance measurement in this connection primarily—on account of the long coherence length and the measurement range permitted thereby—use helium-neon gas lasers (HeNe lasers) as light sources. A combination of an absolute distance measuring device and an interferometer for determining distance with an HeNe laser is known from WO 2007/079600 A1, for example.

Furthermore, in modern tracker systems—increasingly as standard—a sensor is used to ascertain a deviation in the received measurement beam from a zero position. This measurable deviation can be used to determine a position difference between the center of a retroreflector and the impingement point of the laser beam on the reflector and to correct or readjust the orientation of the laser beam on the basis of this discrepancy such that the deviation on the sensor is decreased, in particular is "zero", and hence the beam is oriented in the direction of the reflector center. The readjustment of the laser beam orientation allows continuous target tracking (tracking) of the target point to take place and the distance and position of the target point to be continuously determined relative to the measuring appliance. In this case, the readjustment can be realized by means of a change of orientation for the deflection mirror, which can be moved in a motorized manner and is provided for the purpose of deflecting the laser beam, and/or by pivoting the targeting unit that has the beam-guiding laser optical system.

For continuous target tracking, laser trackers according to the prior art regularly have a tracking area sensor in the form of a position-sensitive detector (PSD), with measurement laser radiation reflected at the target being able to be detected thereon. In this connection, a PSD is intended to be understood to mean an area sensor that operates locally in the analog domain and that can be used to determine a focus for a light distribution on the sensor area. In this case, the output signal from the sensor is produced by means of one or more photosensitive areas and is dependent on the respective position of the light focus. Downstream or integrated electronics can be used to evaluate the output signal and to ascertain the focus. In this case, the position of the focus of the impinging light point can be ascertained very quickly and with a very high resolution. However, the PSD can be used to ascertain only a focus of the light distribution, and not a distribution of a plurality of light points.

This PSD can be used to determine a deviation in the impingement point of the sensed beam from a servo control zero point, and the deviation can be taken as a basis for readjusting the laser beam to the target. For this purpose and in order to achieve a high level of precision, the field of view of this PSD is chosen to be comparatively small, i.e. to correspond to the beam diameter of the measurement laser beam.

Sensing using the PSD takes place coaxially with respect to the measurement axis, as a result of which the sensing direction of the PSD corresponds to the measurement direction. The PSD-based tracking and the fine targeting can be applied only after the measurement laser has been oriented to a retroreflective target.

The target tracking described needs to be preceded by coupling of the laser beam to the reflector. To this end, a sensing unit having a position-sensitive sensor and having a relatively large field of view may additionally be arranged on the tracker. Furthermore, appliances of the type in question incorporate additional illumination means that are used to illuminate the target or the reflector, particularly at a defined wavelength that differs from the wavelength of the distance measuring means. In this connection, the sensor may be in a form that is sensitive to a range around this particular wavelength, for example in order to reduce or completely prevent extraneous light influences. The illumination means can be used to illuminate the target, and the camera can be used to capture an image of the target with an illuminated reflector. The mapping of the specific (wavelength-specific) reflex on the sensor allows the reflex position in the image to be resolved and hence an angle relative to the capture direction of the camera and a direction to the target or reflector to be determined. An embodiment of a laser tracker having such a target searching unit is known from WO 2010/148525 A1, for example. However, this embodiment has no functionality for ascertaining the spatial orientation of an auxiliary measuring instrument.

A disadvantage of laser trackers in the prior art is the need to use at least two separate optical components for sensing the orientation of an auxiliary measuring instrument and for target tracking. Not only does this increase the involvement in terms of materials and design, and hence the production costs, but it also makes the tracker larger and heavier and hence impairs ease of transport and handling for the user.

SUMMARY

Some embodiments of the invention provide for a laser tracker that is improved in comparison with the prior art.

Some embodiments of the invention provide for a laser tracker having less involvement in terms of design and the materials.

Some embodiments of the invention is to provide a laser tracker that is smaller, lighter and saves more energy than appliances in the prior art.

Some embodiments of the invention provide for a laser tracker that has a functionality for sensing the orientation of an auxiliary measuring instrument.

Some embodiments of the invention provide for an improved laser tracker system comprising a laser tracker and an auxiliary measuring instrument.

Some embodiments Furthermore, it is an object of the invention to provide for a method for determining the position of a target that is improved in comparison with methods in the prior art.

According to the invention, a laser tracker for determining the position of an auxiliary measuring instrument that has a retroreflector and a multiplicity of target markings, and also for continuously tracking the auxiliary measuring instrument, wherein the target markings are arranged in a known fixed spatial distribution on the auxiliary measuring instrument and are embodied to emit or reflect light beams, has the following:
 a first radiation source for producing measurement radiation,
 a distance measuring module having distance measuring functionality, and
 a target sensing unit for determining an impingement point for radiation reflected by the retroreflector on a sensor of the target sensing unit and for producing an output signal in order to control a fine targeting functionality and a target tracking functionality,
wherein the target sensing unit is embodied, according to the invention,
 to determine impingement points for light beams reflected or emitted by a multiplicity of target markings of the auxiliary measuring instrument on the sensor, and
 to ascertain the spatial orientation of the auxiliary measuring instrument on the basis of the distribution of the impingement points of the light beams.

In one embodiment, the laser tracker also has the following:
 a base that defines a vertical axis,
 a support that defines a tilt axis that is essentially at right angles to the vertical axis, wherein the support can be pivoted about the vertical axis relative to the base in a motorized manner, and a horizontal pivot angle is defined by an orientation of the support relative to the base,
 a beam deflection unit that can be pivoted about the tilt axis relative to the support in a motorized manner, wherein a vertical pivot angle is defined by an orientation of the beam deflection unit relative to the support, in order to emit and orient the measurement radiation along an emission axis and in order to receive at least one portion of the measurement radiation reflected at the retroreflector, and
 angle measuring functionality for determining the horizontal pivot angle and the vertical pivot angle.

In one embodiment of the laser tracker according to the invention, the sensor of the target sensing unit is embodied as a two-dimensional image sensor (pixel array sensor), particularly as a CMOS or CCD sensor.

A further embodiment of a laser tracker according to the invention is characterized by an optical system of the target sensing unit with unalterable focus and unalterable zoom, particularly having a fixed focus lens.

In one embodiment, the laser tracker has means for wireless communication with the auxiliary measuring instrument, which means are used to embody the laser tracker to control an on state of the target markings of the auxiliary measuring instrument, particularly to switch the on state of target markings on and off in sync, particularly for the purpose of temporally successive target tracking and orientation determination by means of the target sensing unit, and/or on the basis of a distance between the laser tracker and the auxiliary measuring instrument.

In one embodiment of the laser tracker according to the invention, the target sensing unit has a target tracking mode and an orientation sensing mode, wherein the target sensing unit
 in the target tracking mode is embodied to determine the impingement point of the reflected radiation on the sensor of the target sensing unit and to produce the output signal in order to control the fine targeting functionality and the target tracking functionality, and
 in the orientation sensing mode is embodied to determine the distribution of the impingement points of the light beams on the sensor of the target sensing unit and, on the basis thereof, to ascertain the spatial orientation of the auxiliary measuring instrument, wherein the orientation sensing mode comprises a measurement sequence with recording events that are triggered by an electronic shutter of the sensor, particularly wherein the target sensing unit is in the target tracking mode as standard, and the orientation sensing mode can be dialed in under user control and lasts a stipulated period of time.

In one embodiment of the laser tracker according to the invention, said laser tracker has a joint input and output optical system for transmitting the measurement radiation, for recording the reflected radiation and for admitting the light beams from the target markings.

In a further embodiment of the laser tracker according to the invention, said laser tracker has a second radiation source for producing a target tracking radiation, and beam deflection means for the coaxial transmission of the measurement radiation and the target tracking radiation by the joint input and output optical system.

In one embodiment, the measurement radiation, the target tracking radiation and the beam deflection means are of a nature such that a first portion of the reflected radiation can be directed onto the distance measuring module and a second portion of the reflected radiation can be directed onto the sensor of the target sensing unit.

In one particular embodiment, the measurement radiation and the target tracking radiation differ from one another, particularly in terms of their polarity and/or wavelength. In this case, in particular, the beam deflection means are of a nature such that a first portion of the reflected radiation can be directed onto the distance measuring module and a second portion of the reflected radiation can be directed onto the sensor of the target sensing unit, and/or the beam path of the target sensing unit is provided with a filter that is essentially pervious to the target tracking radiation and essentially impervious to the measurement radiation.

In one embodiment of the laser tracker according to the invention, said laser tracker has at least one coarse targeting unit, particularly having illumination means, for coarsely determining the position of the auxiliary measuring instrument and for producing an output signal in order to control a targeting functionality.

In a further embodiment of the laser tracker according to the invention, said laser tracker has an overview camera, particularly having illumination means, for recording images of the measurement surroundings.

In one particular embodiment of the laser tracker according to the invention, said laser tracker has a display unit, particularly for displaying images from the overview camera and/or information about performed measurements and the appliance state.

In another embodiment of the laser tracker according to the invention, the first radiation source has a helium-neon laser module and the distance measuring module has an interferometer.

A laser tracker system having a laser tracker according to the invention and an auxiliary measuring instrument that has a retroreflector and a multiplicity of target markings, wherein the target markings are arranged in a known fixed spatial distribution on the auxiliary measuring instrument, and are embodied to emit or reflect light beams, has, according to the invention, means for wireless communication between the laser tracker and the auxiliary measuring instrument in order to control an on state of the target markings, particularly in order to switch the radiance of target markings on and off in sync.

In one embodiment of the laser tracker system, the radiance of the target markings is controlled for the purpose of temporally successive target tracking and orientation determination by means of the target sensing unit.

In a further embodiment of the laser tracker system, the radiance of the target markings is controlled on the basis of a distance between the laser tracker and the auxiliary measuring instrument.

A method for determining the position of an auxiliary measuring instrument that has a retroreflector and a multiplicity of target markings, and also particularly for continuously tracking the auxiliary measuring instrument, by means of a laser tracker, wherein the target markings are arranged in a known fixed spatial distribution on the auxiliary measuring instrument, and are embodied to emit or reflect light beams, involving orientation of a beam deflection unit of the laser tracker, which beam deflection unit emits radiation, to the auxiliary measuring instrument, transmission of a radiation to the retroreflector in order to produce a reflected radiation, reception of the reflected radiation using a sensor of a target sensing unit, determination of an impingement point for the reflected measurement radiation on the sensor, production of an output signal in order to control a target tracking functionality, on the basis of the impingement point, reception of the reflected radiation using a distance measuring unit, determination of a distance from the retroreflector, determination of a direction to the retroreflector, and determination of a spatial location of the auxiliary measuring instrument using light beams from the target markings, involves, according to the invention, reception of light beams from the target markings using the sensor, wherein the spatial location of the auxiliary measuring instrument is determined by determining positions for the impingement points of the target markings on the sensor.

In one embodiment of the method according to the invention, the beam deflection unit is oriented to the auxiliary measuring instrument by means of a coarse targeting functionality that is controlled by an output signal from a coarse targeting unit, wherein the method furthermore involves illumination of the auxiliary measuring instrument by illumination means of the coarse targeting unit in order to produce a reflection by the retroreflector, reception of the reflection by the coarse targeting unit, and coarse determination of the position of the auxiliary measuring instrument on the basis of the reflection, and production of the output signal in order to control the coarse targeting functionality, on the basis of the coarse position of the auxiliary measuring instrument.

In a further embodiment of the method according to the invention, the reception of the reflected radiation using the sensor and the reception of the light beams take place sequentially, particularly wherein the transmission of the radiation and transmission of light beams from the target markings take place alternately in a manner coordinated with one another.

BRIEF DESCRIPTION OF THE DRAWINGS

The laser tracker according to the invention, the laser tracker system according to the invention and the measurement method according to the invention are described in more detail below purely by way of example with reference to specific exemplary embodiments that are shown schematically in the drawings, with further advantages of the invention also being discussed. Specifically.

DETAILED DESCRIPTION

Figure 1:
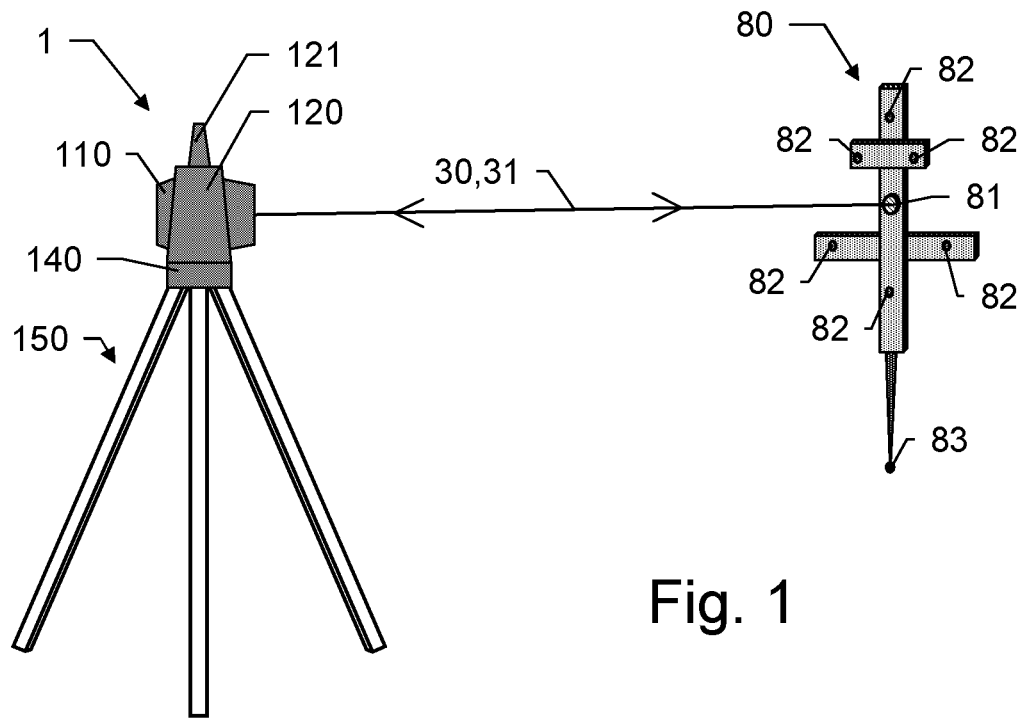
FIG. 1 shows an exemplary embodiment of a laser tracker according to the invention with an auxiliary measuring instrument.

FIG. 1 shows an exemplary embodiment of a laser tracker 1 according to the invention, comprising a base 140, a support 120, fitted thereto, with a grip 121 and a beam deflection unit 110 mounted on two crosspieces (not shown here) of the support 120. The depicted laser tracker 1 is arranged on a tripod 150 and uses a laser beam 30 to measure the distance from a retroreflector 81 located on an auxiliary measuring instrument 80. In addition, the auxiliary measuring instrument 80—in this case embodied as a measurement probe by way of example—comprises a number of target markings 82, for example in the form of reflective or self-luminous light points, and also a measurement head 83 for placement on a target point to be surveyed on a target object 85.

In order to be able to detect and reconstruct movements by the auxiliary measuring instrument 80, so that the laser beam 30 remains oriented to the retroreflector 81, the laser tracker 1 has a target sensing unit.

The target sensing unit is preferably arranged in the beam deflection unit 110 and, by sensing the orientation of the laser beam 31 reflected by a target, particularly the retroreflector 81, allows the orientation of the transmitted laser beam 30 to be readjusted. The readjustment of the laser beam orientation allows continuous target tracking of the auxiliary measuring instrument 80 to take place and the distance and position of the target point to be continuously determined relative to the laser tracker 1.

Figure 2:
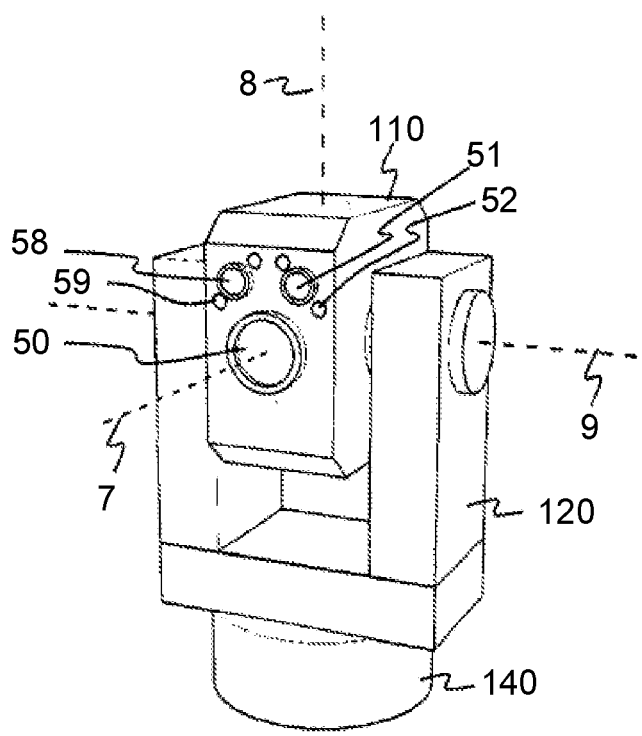
FIG. 2 shows an exemplary embodiment of a laser tracker according to the invention.

FIG. 2 schematically shows the outer design of a laser tracker 1 with the elements entry and exit optical system 50, coarse targeting unit 51 with in this case two light sources 52 on two sides of the entry optical system of the coarse targeting unit 51, and also an overview camera 58 with its illumination 59, in this case likewise with two individual light sources on two sides of the entry optical system of the overview camera 58. In addition, the following is shown: the measurement or emission axis 7, a pivot axis 8, about which the support 120 can rotate in relation to a base 140, and a tilt axis 9, about which the beam deflection unit 110 can be inclined in relation to the support 120 and.

A regulatory and control unit (not shown here) captures and processes the measured values from various sensors and controls axial position motors for orienting the beam deflection unit 110. A display apparatus (not shown) shows information about measurements and the appliance state and can also display images from one of the existent image sensors, particularly the overview camera 58. The coarse targeting unit 51 may alternatively also have more than one optical system.

Figure 3:
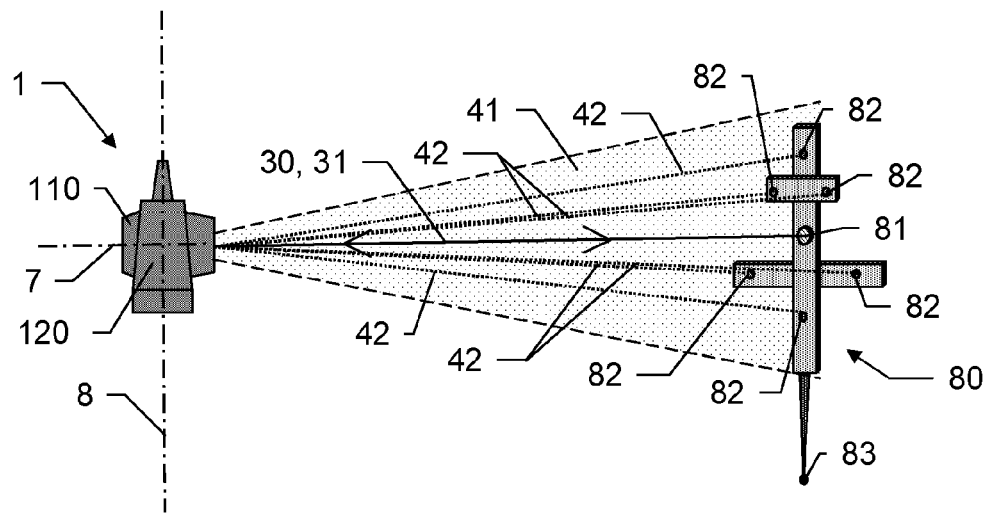
FIG. 3 shows ascertainment, according to the invention, of the position and orientation of the auxiliary measuring instrument.

FIG. 3 uses the embodiment shown in FIG. 1 to illustrate the ascertainment of the position and the orientation of the auxiliary measuring instrument 80. A radiation source of the laser tracker 1 uses an output optical system of the beam deflection unit 110 to send measurement radiation 30 to the retroreflector 81 of the auxiliary measuring instrument 80. The measurement radiation 30 is reflected to the beam deflection unit 110 by the retroreflector 81 as reflected measurement radiation 31. At the beam deflection unit, the reflected measurement radiation 31 is routed to a distance measuring apparatus 38 that ascertains a distance from the auxiliary measuring instrument 80. At the same time, an image sensor of the laser tracker 1 receives light beams 42 transmitted with a viewing angle range 41 by light points 82 of the auxiliary measuring instrument 80. The light points 82, particularly LEDs, are arranged on the auxiliary measuring instrument 80 in a known, in particular three-dimensional, pattern. The arrangement of impingement points of the light beams 42 from the light points 82 on the image sensor can be used to ascertain an orientation for the auxiliary measuring instrument 80. In particular, the laser tracker 1 may have an identification functionality for automatically identifying the auxiliary measuring instrument 80 used. Data about various auxiliary measuring instruments 80 that can be used may be retrievable in a database of the laser tracker 1. These data may comprise particularly the arrangement of the target markings 82 on the respective auxiliary measuring instrument 80.

Figure 4A:
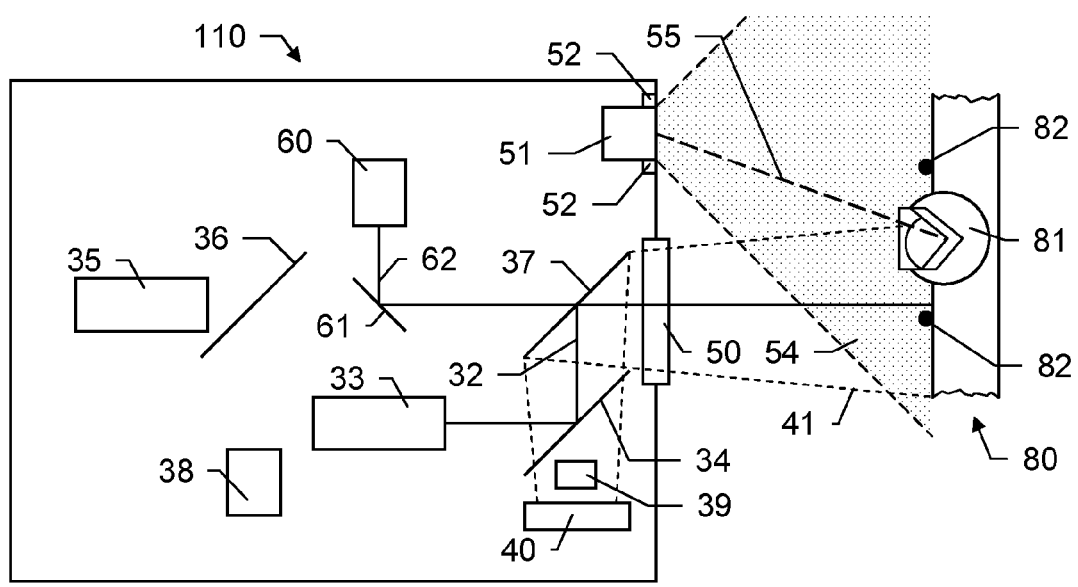
FIGS. 4a-b use a schematic design of the targeting unit in a first exemplary embodiment of a laser tracker according to the invention to show the coarse orientation to the auxiliary measuring instrument and the ascertainment of the position of the auxiliary measuring instrument.
Figure 4B:
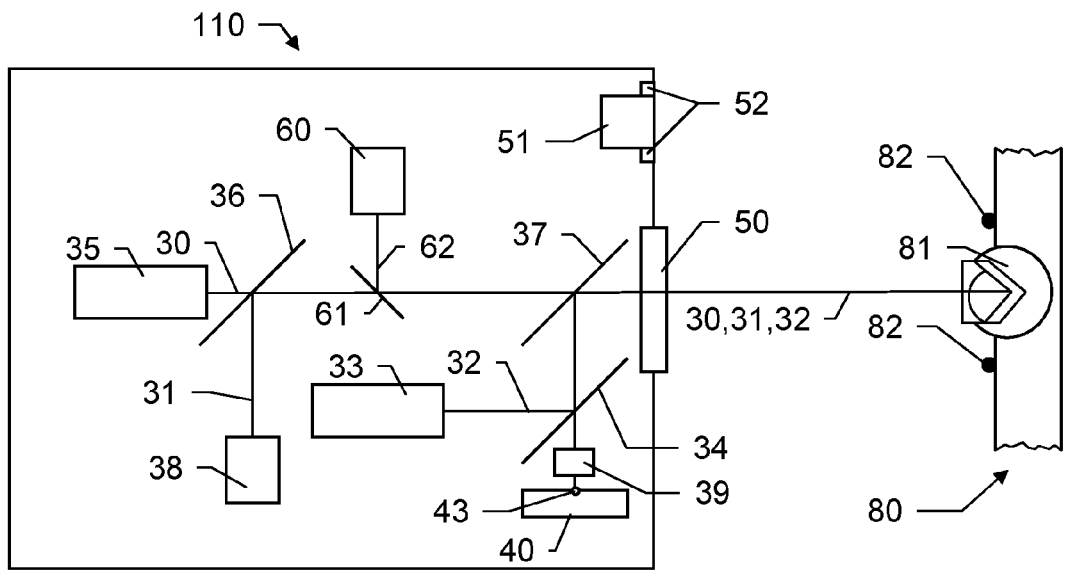

FIGS. 4a and 4b use a schematic design of a first exemplary embodiment of a beam deflection unit 110 of a laser tracker 1 according to the invention as shown in FIG. 2 to illustrate the coarse orientation of the beam deflection unit 110 to an auxiliary measuring instrument 80 (FIG. 4a) and the ascertainment of the position of the auxiliary measuring instrument 80 (FIG. 4b).

The auxiliary measuring instrument 80 has a retroreflector 81 and a multiplicity of target markings in the form of punctuate light sources 82, particularly LEDs, in a fixed, known spatial distribution.

On its front side facing the auxiliary measuring instrument 80, the beam deflection unit 110 has an entry and exit optical system 50 for transmitting radiation along the measurement axis and for admitting reflected radiation, and also has a coarse targeting unit 51 with two light sources 52. The entry and exit optical system 50 may be embodied particularly as a fixed focus lens with unalterable focus and unalterable zoom.

Inside, the beam deflection unit 110 has a first radiation source 35 for producing a measurement radiation 30, and also a distance measuring apparatus 38 for receiving the reflected measurement radiation 31 and for ascertaining a distance from a target, in this case the retroreflector 81. In the example shown, the distance measuring apparatus 38 is an absolute distance measuring appliance, but may also be an interferometer, or a combination of both.

Furthermore, the beam deflection unit 110 has a second radiation source 33 for producing a target tracking radiation 32 and a target sensing unit 40 for receiving the reflected target tracking radiation, for determining an impingement point 43 of the reflected radiation on a sensor, particularly embodied as a two-dimensional image sensor (pixel array sensor), of the target sensing unit 40 and for producing an output signal in order to control a target tracking functionality of the laser tracker 1.

Preferably, the optical axis of the first radiation source 35 runs outside the laser tracker coaxially with respect to the optical axis of the second radiation source 33 on a common emission axis 7. This presupposes that the two radiation sources 33, 35 have a common exit optical system 50. A common entry and exit optical system 50 for two beam paths means that the two beam paths exit the appliance into the surroundings of the appliance, or enter the appliance from the surroundings of the appliance, through the same optical element, such as a lens or a pane. Usually, the beam paths are at least approximately coaxial in this case.

Furthermore, the beam deflection unit 110 has a number of beam splitters 34, 36, 37, via which the measurement and target tracking radiations 30, 32 are emitted along the emission axis 7 by the entry and exit optical system 50 and via which the radiation reflected by the retroreflector 81 is routed to the distance measuring apparatus 38 and the sensor surface of the target sensing unit 40.

The light sources 82 of the auxiliary measuring instrument 80 preferably emit light beams 42 having the same or a similar wavelength range as the target tracking radiation 32.

The measurement radiation 30 and the target tracking radiation 32 differ from one another, particularly in terms of their polarity and/or wavelength, such that an appropriate embodiment of a filter 39 positioned upstream of the target sensing unit 40 means that the reflected radiation intended for the distance measurement is filtered out and does not reach the target sensing unit 40. Similarly, it is thus possible for any external interference radiation occurring to be filtered out, so that only the light beams 42 from the light sources 82 and the target tracking radiation 32 reach the sensor of the target sensing unit 40. Alternatively or in addition, an appropriate embodiment of the beam splitter 37 means that all of the reflected radiation 31 may be able to be separated into a component that is intended for distance measurement and a component that is intended for target tracking. The beam splitter 37 is then essentially pervious to one of the two radiations, while it reflects the other. The beam splitter 37 presented here would then allow the radiation that is intended for distance measurement through to the distance measuring apparatus 38 and would reflect only the radiation that is intended for target tracking to the sensor surface of the target sensing unit 40.

The drawing likewise shows an optional pointer unit with a pointer radiation source 60 for producing a visible pointer beam 62 that can be emitted by the entry and exit optical system 50 via a pointer beam splitter 61 essentially coaxially with respect to the measurement radiation 30 and with respect to the target tracking radiation 32. In this case, the pointer beam produces a visible (for example red) impingement point and is used to provide the user with information, particularly when measurement radiation 30 and target tracking radiation 32 are embodied so as to be invisible to the human eye.

FIG. 4a illustrates a functionality for the coarse orientation of the beam deflection unit 110 to the auxiliary measuring instrument 80 by means of the coarse targeting unit 51.

The coarse targeting unit 51 has a position sensing sensor. Light from the light source 52 of the coarse targeting unit 51, which may have a single individual light source or a plurality of individual light sources, is radiated at a relatively large radiation angle. This radiation angle is somewhat larger than the viewing angle range 54 of the coarse targeting unit 51. The viewing angle range 54 of the coarse targeting unit 51 is particularly more than 3° or more than 10° or more than 15° or up to around 30° (i.e. ±15°). This means that the auxiliary measuring instrument 80 is still visible to the coarse targeting unit 51 even when it has not yet been sensed by the target sensing unit 40 with its comparatively narrow viewing angle range 41. The reflection of the light from the light source 52 becomes visible and measurable as a coarse position on the position sensing sensor of the coarse targeting unit 51.

This measurement is used to orient the beam deflection unit 110 to the auxiliary measuring instrument 80 until the target tracking radiation 32 emitted by the second radiation source 33 impinges on the retroreflector 81 and the target sensing unit 40 detects the reflected target tracking radiation. Next, the detected radiation is used in a known manner to track the auxiliary measuring instrument 80 (tracking).

FIG. 4b illustrates a functionality for ascertaining the position, i.e. distance and direction, of the auxiliary measuring instrument 80. The beam deflection unit 110 is oriented to the auxiliary measuring instrument 80 such that the target tracking radiation 32 emitted by the second radiation source 33 impinges on the retroreflector 81 and the target sensing unit 40 detects the reflected target tracking radiation. By determining an impingement point 43 of the reflected radiation on the sensor surface of the target sensing unit 40, an output signal for controlling a fine targeting functionality and a target tracking functionality of the laser tracker 1 is produced.

In order to ascertain the distance from the auxiliary measuring instrument 80, the first radiation source 35 produces a measurement radiation 30 that is sent coaxially with the target tracking radiation 32 to the retroreflector 81, where it is retroreflected—on account of the continuous target tracking—likewise coaxially. The reflected measurement radiation 31 is routed via beam splitters 36, 37 to the distance measuring apparatus 38, which ascertains a distance from the auxiliary measuring instrument 80. At the same time, angle measurement functionality of the laser tracker 1 is used to ascertain the current orientation of the beam deflection unit 110 and hence the direction to the auxiliary measuring instrument 80. The direction and the distance can be used to determine a relative position of the auxiliary measuring instrument 80 in relation to the laser tracker 1.

Figure 5:
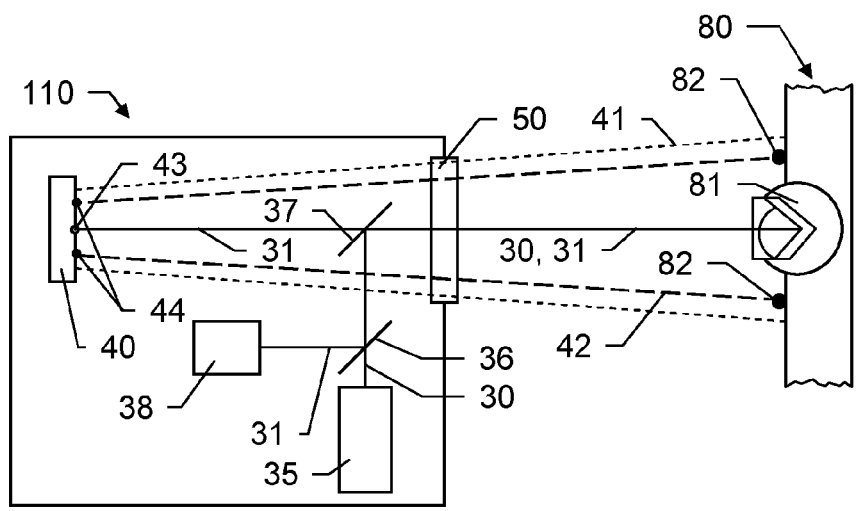
FIG. 5 uses a schematic design of the targeting unit in a second exemplary embodiment of a laser tracker according to the invention to show the ascertainment of the position and orientation of the auxiliary measuring instrument.
Figure 6:
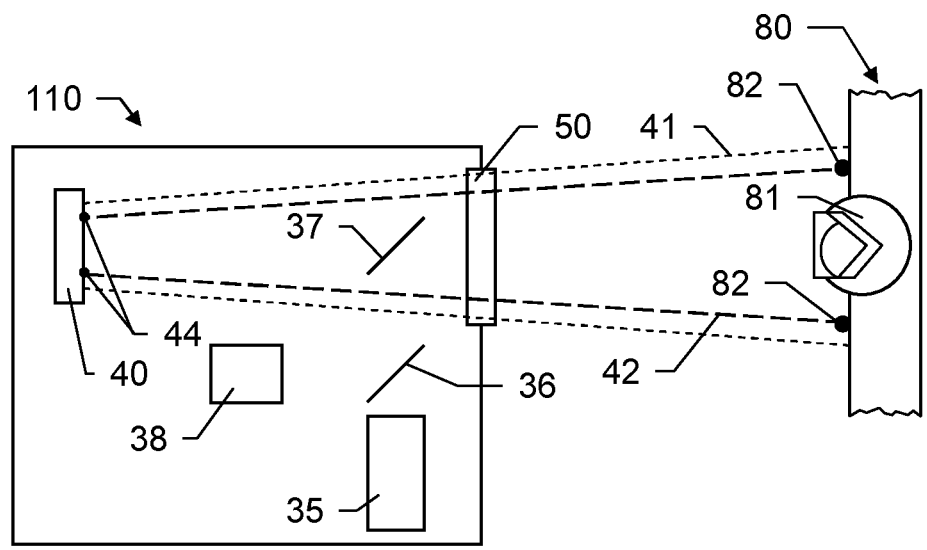
FIG. 6 uses a schematic design of a targeting unit as shown in FIG. 5 to show the sole ascertainment of the orientation of the auxiliary measuring instrument.

FIGS. 5 and 6 show a schematic design of a second exemplary embodiment of a beam deflection unit 110 of a laser tracker 1 according to the invention. In this embodiment, only a single radiation source 35 is provided, the measurement radiation 30 of which is used both for ascertaining the distance from the auxiliary measuring instrument 80 and for target tracking. Although not shown here, this embodiment may naturally also optionally have a coarse targeting unit 51, an overview camera 58, a filter 39 and/or a pointer radiation source 60.

FIG. 5 shows simultaneous ascertainment of the position and the orientation of the auxiliary measuring means 80. In this case, the radiation source 35 transmits measurement radiation 30 to the retroreflector 81, and the reflected measurement radiation 31 is routed via beam splitters 36, 37 partly to a sensor of the target sensing unit 40 and partly to the distance measuring apparatus 38. At the same time, the target markings embodied as LEDs 82 emit light beams 42 in the direction of the laser tracker, particularly in a similar wavelength range to the measurement radiation 30. The light beams 42 pass through the exit optical system 50 into the inside of the beam deflection unit 110 and, there, are routed to the sensor of the target sensing unit 40. The impingement points 44 of the light beams 42 on the sensor surface are detected. From the arrangement of the multiplicity of impingement points 44 on the sensor of the target sensing unit 40 it is possible to ascertain the spatial orientation of the auxiliary measuring instrument 80. The method presented can accordingly be used to ascertain the spatial location of the auxiliary measuring instrument 80 in six degrees of freedom (6DOF). Hence, it is also possible to exactly determine the position of a point of an object at which a measurement head of the auxiliary measuring instrument 80 (see FIG. 1) makes contact, for example.

As an alternative to the method shown in FIG. 5, FIG. 6 shows the sole ascertainment of the orientation of the auxiliary measuring instrument 80. In order to avoid any errors when distinguishing the impingement point of the reflected measurement radiation and the impingement points 44 of the light beams 42 from the target markings 82, the measurement radiation is briefly switched off for the purpose of ascertaining the arrangement of the multiplicity of impingement points 44 on the sensor surface of the target sensing unit 40, and hence the spatial orientation of the auxiliary measuring instrument 80.

The transmission of the light beams 42 by the LEDs 82 of the auxiliary measuring instrument 80 can—in all the variants shown—be effected both continuously and under user control or at the request of the laser tracker—for example using the measurement radiation 30, an additional infrared transmitter and receiver or by means of Bluetooth®.

Figure 7A:
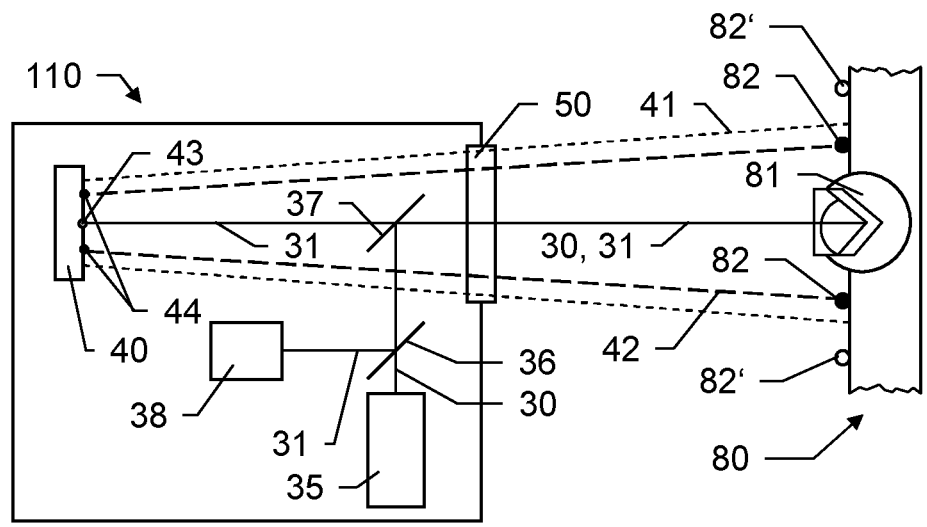
FIGS. 7a-b show ascertainment of the orientation of the auxiliary measuring instrument shown in FIG. 5 at different lengths of distances to the auxiliary measuring instrument by virtue of various groups of light points on the auxiliary measuring instrument being switched on and off.
Figure 7B:
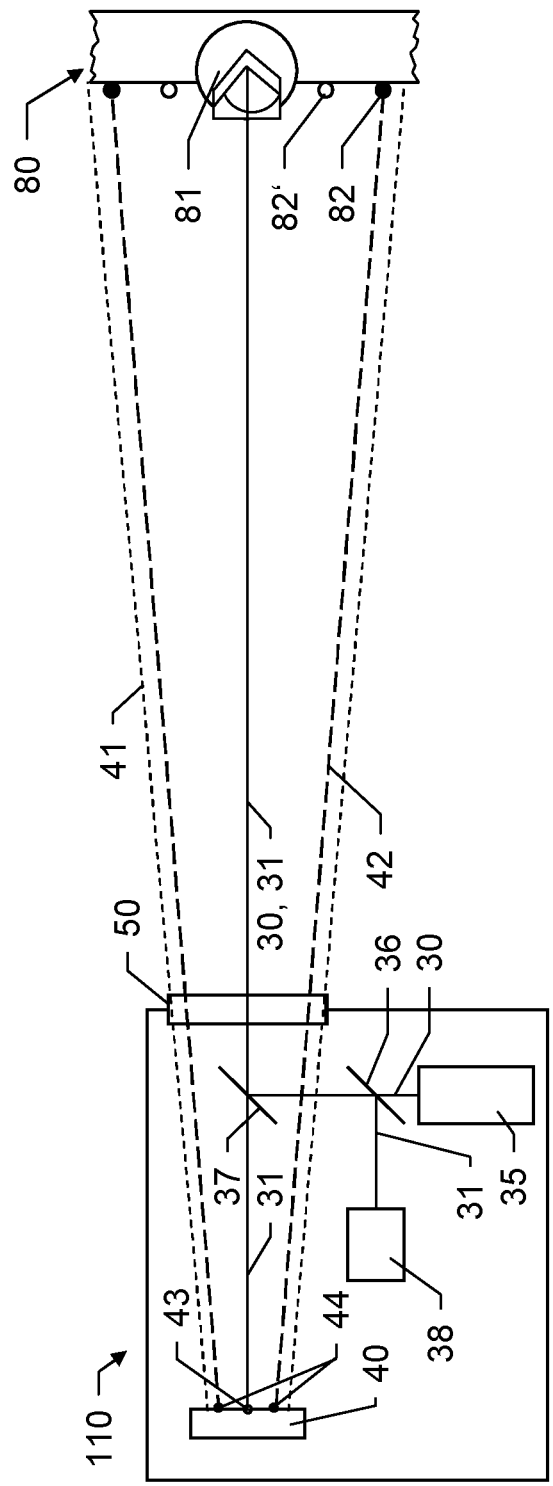

FIGS. 7*a* and 7*b* show an exemplary embodiment of the method according to the invention for an auxiliary measuring instrument 80 having two groups of target markings 82, 82'. The target markings 82, 82', which are embodied as self-luminous punctuate light sources, particularly LEDs, are in this case present in duplicate in a known arrangement, and can form the same pattern in different sizes, in particular twice. In this case, the two groups can be switched on and off separately from one another. This is described in EP 2 008 120 B1 for example.

FIG. 7*a* shows the auxiliary measuring instrument 80 at a relatively short distance from the beam deflection unit 110 and hence from the target sensing unit 40. The viewing angle range 41 of the target sensing unit 40 is much smaller than the viewing angle range 54 of the coarse targeting unit 51 (see FIG. 4*a*). Its small viewing angle range 41 and the proximity to the auxiliary measuring instrument 80 mean that the target sensing unit 40 can sense only one of the two LED groups, while the second is situated outside the viewing angle range 41. The light sources 82 of the inner group are therefore switched on and emit light beams 42 that can be sensed and evaluated by the target sensing unit 40. The light sources 82' of the outer group are preferably switched off, on the other hand.

FIG. 7*b* shows the auxiliary measuring instrument 80 at a distance from the beam deflection unit 110 that is significantly enlarged in comparison with FIG. 7*a*. On account of the distance, the target sensing unit 40 is able to sense both LED groups in this case despite its small viewing angle range 41. Since the pattern of the inner LED group will be mapped on the sensor surface of the target sensing unit 40 very small on account of the long distance, which could affect the accuracy of the orientation ascertainment, the outer LED group is used for ascertaining the orientation in this case. The light sources 82' of the inner group are therefore switched off in this case, while the light sources 82 of the outer group emit light beams 42 to the sensor of the target sensing unit 40.

Which of the two (or possibly also more) groups of light sources 82, 82' on the auxiliary measuring instrument 80 is switched on is dependent on the distance between laser tracker 1 and auxiliary measuring instrument 80. The current distance can be ascertained particularly by means of the measurement radiation 30, and this—or a corresponding command—can be communicated to the auxiliary measuring instrument 80.

Such communication can be effected using the measurement radiation 30, an additional infrared transmitter on the laser tracker 1 or by means of Bluetooth®, for example. Similarly, it is possible to communicate with a user of the auxiliary measuring instrument 80, for example when the auxiliary measuring instrument 80 needs to be rotated in the direction of the laser tracker 1 to a greater extent. In that case, the auxiliary measuring instrument 80 can send a visual or audible signal, for example, to the user or else can vibrate, for example.

Figure 8A:
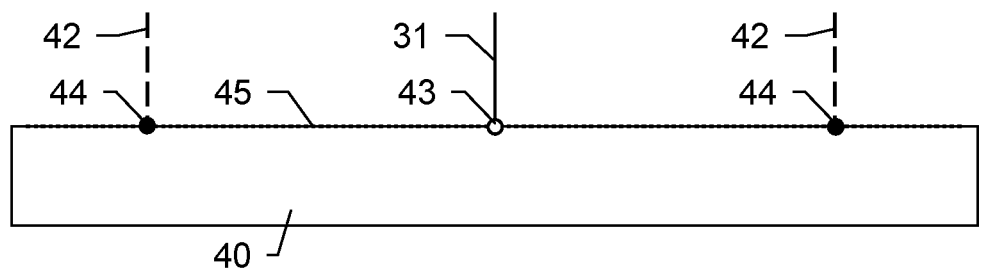
FIGS. 8a-b show an exemplary embodiment of a target sensing unit according to the invention with an image sensor, having both a target tracking functionality and an orientation ascertainment functionality.
Figure 8B:
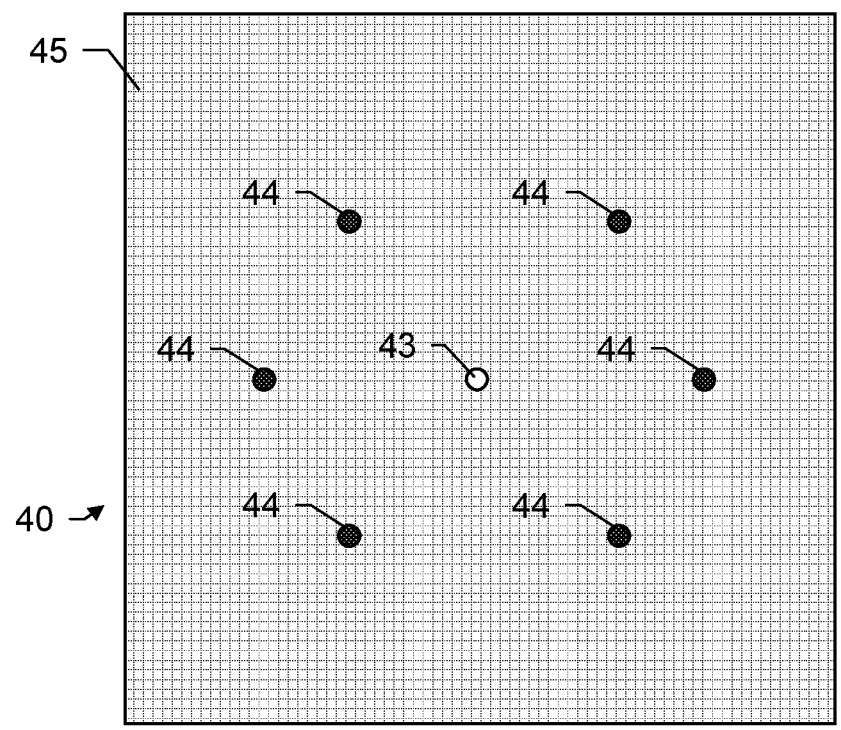

FIGS. 8*a* and 8*b* show an exemplary embodiment of a target sensing unit 40 according to the invention. In this case, FIG. 8*a* shows the unit in a cross section and FIG. 8*b* shows the sensor 45 in a plan view.

The target sensing unit 40 shown has an image sensor 45, for example a CMOS or CCD sensor, the light-sensitive sensor surface of which is embodied to sense the position of the impingement points 43, 44 of light beams 31, 42 on the sensor 45. Depending on the position of the impingement point 43 of the reflected measurement or target tracking radiation 31, particularly relative to a defined servo control zero point, for example a center point of the sensor surface, it is possible to control a target tracking functionality of the laser tracker. From the positions of the impingement points 44 of the light beams 42 transmitted by the light points of the auxiliary measuring instrument, it is possible to infer a current orientation for the auxiliary measuring instrument.

Preferably, the impingement points 44 of the light beams 42 transmitted by the light points of the auxiliary measuring instrument can be clearly distinguished from the impingement point 43 of the reflected measurement or target tracking radiation 31 by the sensor 45 of the target sensing unit 40. Alternatively, as FIG. 6 shows, the target tracking and the ascertainment of the orientation can be performed at separate times from one another: in order to avoid any errors when distinguishing the impingement point 43 of the reflected measurement radiation 31 and the impingement points 44 of the light beams 42 from the LEDs of the auxiliary measuring instrument, the measurement radiation can be briefly switched off in an orientation sensing mode in order to ascertain the arrangement of the multiplicity of impingement points 44 on the sensor 45, and hence the spatial orientation of the auxiliary measuring instrument. Similarly, the LEDs on the auxiliary measuring instrument can remain switched off in a target tracking mode during target tracking in order to be briefly switched on only for ascertaining the spatial orientation.

FIGS. 9*a-f* illustrate an exemplary cycle for an orientation sensing mode in a laser tracker system according to the invention in order to ascertain the orientation of an auxiliary measuring instrument, having at least one group of luminous units as target markings. In this case, the axis denoted by t is a respective time line. The cycle presented here is the ascertainment of the orientation as the result of a user input.

Figure 9A:
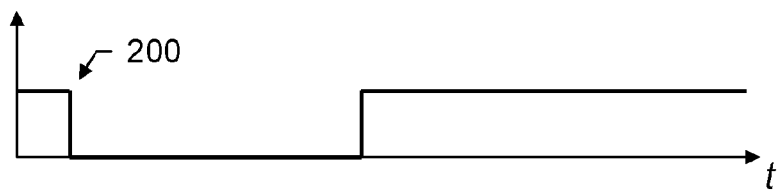
FIGS. 9a-f show an exemplary cycle for ascertaining the orientation of the auxiliary measuring instrument in a laser tracker system according to the invention.

FIG. 9a shows the state of a switch on the auxiliary measuring instrument, said switch being used by a user to trigger the orientation sensing mode. At a desired time, the user triggers the measurement functionality by briefly depressing 200 the switch.

Figure 9B:
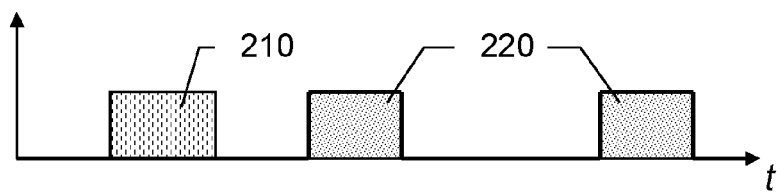

FIG. 9b shows the state of the luminous units (or of a group of the luminous units) of the auxiliary measuring instrument. After a short time delay, subject to technical circumstances, particularly with a delay of a few milliseconds, a luminous unit sends light in the infrared spectrum with a coded command to an infrared reception unit of the laser tracker for a short period of time 210. Shortly afterward, i.e. a few milliseconds later, a luminous sequence of the luminous units begins, from which it is possible to infer an orientation of the auxiliary measuring instrument. In particular, this may comprise two luminous periods 220, with only a predefined luminous unit or a particular subset of the luminous units being on during the first period, and all the luminous units (or all the luminous units in a luminous unit group) being on during the second period.

Figure 9C:

FIG. 9c shows the state of an infrared reception unit of the laser tracker. Said infrared reception unit receives the coded command for orientation ascertainment in the period of time 211. The infrared reception unit may particularly be accommodated in the distance measuring module of the laser tracker.

Figure 9D:
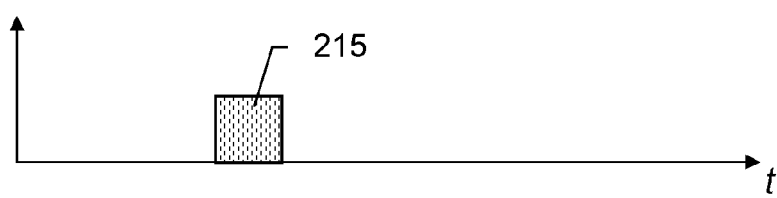

If the auxiliary measuring instrument (as FIGS. 7a-b show) has a plurality of groups of luminous units, it is optionally possible at this time—on the basis of a distance measured beforehand—to send a command 215 to the auxiliary measuring instrument for which of the plurality of groups is meant to be on. This is shown in FIG. 9d. Such a command 215 can be transmitted particularly by means of the measurement radiation. Otherwise, it is optionally possible to transmit confirmation to the auxiliary measuring instrument that the signal has been received, and a measurement sequence is being initiated.

Figure 9E:
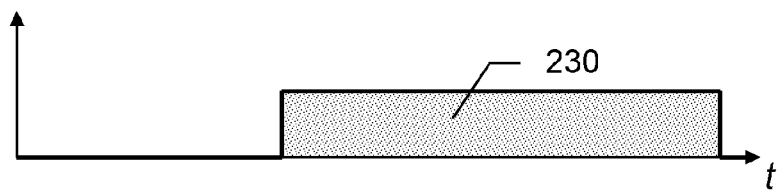

FIG. 9e shows the measurement sequence 230 of the target sensing unit; this measurement sequence starts as soon as the command for orientation ascertainment has been forwarded from the infrared reception unit to the target sensing unit. This may again last a few milliseconds, subject to technical circumstances.

Figure 9F:
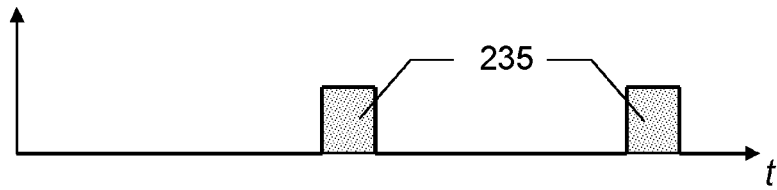

During the measurement sequence 230, the target sensing unit controls an electronic shutter of an image sensor. This is shown in FIG. 9f. This drawing shows two recording periods 235 for the image sensor. In this case, the first period begins particularly approximately 100 milliseconds after the switch is triggered by the user. The recording periods 235 are in sync with the luminous periods 220 shown in FIG. 9b, particularly such that the recording periods 235 are shorter than the luminous periods 220, as a result of which it is possible to record an on state of the luminous units over a respective entire recording period 235 for the image sensor.

It goes without saying that these figures that are shown are merely a schematic illustration of possible exemplary embodiments. The various approaches can likewise be combined with one another and also with methods and appliances from the prior art.

The invention claimed is:

1. A laser tracker for determining the position of an auxiliary measuring instrument that has a retroreflector and a multiplicity of target markings, and also for continuously tracking the auxiliary measuring instrument, wherein the target markings are arranged in a known fixed spatial distribution on the auxiliary measuring instrument and are embodied to emit or reflect light beams, and wherein the laser tracker comprises:
   a first radiation source for producing measurement radiation;
   a distance measuring module having distance measuring functionality; and
   a target sensing unit for determining an impingement point for radiation reflected by the retroreflector on a sensor of the target sensing unit and for producing an output signal in order to control a fine targeting functionality and a target tracking functionality, wherein the target sensing unit is configured to:
      determine impingement points for light beams reflected or emitted by a multiplicity of target markings of the auxiliary measuring instrument on the sensor, and
      ascertain the spatial orientation of the auxiliary measuring instrument on the basis of the distribution of the impingement points of the light beams,
   the laser tracker further comprising means for wireless communication with the auxiliary measuring instrument, which means are used to embody the laser tracker to control an on state of the target markings of the auxiliary measuring instrument to switch the radiance of target markings on and off in sync.

2. The laser tracker according to claim 1, further comprising:
   a base that defines a vertical axis;
   a support that defines a tilt axis that is essentially at right angles to the vertical axis, wherein the support can be pivoted about the vertical axis relative to the base in a motorized manner, and a horizontal pivot angle is defined by an orientation of the support relative to the base;
   a beam deflection unit that can be pivoted about the tilt axis relative to the support in a motorized manner, wherein a vertical pivot angle is defined by an orientation of the beam deflection unit relative to the support, in order to emit and orient the measurement radiation along an emission axis and in order to receive at least one portion of the measurement radiation reflected at the retroreflector; and
   angle measuring functionality for determining the horizontal pivot angle and the vertical pivot angle.

3. The laser tracker according to claim 1, wherein the sensor of the target sensing unit comprises a two dimensional image sensor.

4. The laser tracker according to claim 1, further comprising an optical system of the target sensing unit with unalterable focus and/or unalterable zoom.

5. The laser tracker according to claim 1, further comprising a coarse targeting unit, having illumination means, for coarsely determining the position of the auxiliary measuring instrument and for producing an output signal in order to control a coarse targeting functionality.

6. The laser tracker according to claim 1, further comprising:
   an overview camera, having illumination means, for recording images of the measurement surroundings, and
   a display unit for displaying images from the overview camera and/or information about performed measurements and the appliance state.

7. The laser tracker according to claim 1, wherein the sensor of the target sensing unit is comprises a CMOS sensor or CCD sensor.

8. The laser tracker according to claim 1, further comprising an optical system of the target sensing unit having a fixed focus lens.

9. A laser tracker for determining the position of an auxiliary measuring instrument that has a retroreflector and a multiplicity of target markings, and also for continuously tracking the auxiliary measuring instrument, wherein the target markings are arranged in a known fixed spatial distribution on the auxiliary measuring instrument and are embodied to emit or reflect light beams, and wherein the laser tracker comprises:
- a first radiation source for producing measurement radiation;
- a distance measuring module having distance measuring functionality; and
- a target sensing unit for determining an impingement point for radiation reflected by the retroreflector on a sensor of the target sensing unit and for producing an output signal in order to control a fine targeting functionality and a target tracking functionality, wherein the target sensing unit is configured to:
  - determine impingement points for light beams reflected or emitted by a multiplicity of target markings of the auxiliary measuring instrument on the sensor, and ascertain the spatial orientation of the auxiliary measuring instrument on the basis of the distribution of the impingement points of the light beams,
- laser tracker further comprising means for wireless communication with the auxiliary measuring instrument, which means are used to embody the laser tracker to control an on state of the target markings of the auxiliary measuring instrument to switch the radiance of target markings on and off in sync on the basis of a distance between the laser tracker and the auxiliary measuring instrument.

10. A laser tracker for determining the position of an auxiliary measuring instrument that has a retroreflector and a multiplicity of target markings, and also for continuously tracking the auxiliary measuring instrument, wherein the target markings are arranged in a known fixed spatial distribution on the auxiliary measuring instrument and are embodied to emit or reflect light beams, and wherein the laser tracker comprises:
- a first radiation source for producing measurement radiation;
- a distance measuring module having distance measuring functionality; and
- a target sensing unit for determining an impingement point for radiation reflected by the retroreflector on a sensor of the target sensing unit and for producing an output signal in order to control a fine targeting functionality and a target tracking functionality, wherein the target sensing unit is configured to:
  - determine impingement points for light beams reflected or emitted by a multiplicity of target markings of the auxiliary measuring instrument on the sensor, and ascertain the spatial orientation of the auxiliary measuring instrument on the basis of the distribution of the impingement points of the light beams,
- the laser tracker further comprising means for wireless communication with the auxiliary measuring instrument, which means are used to embody the laser tracker to control an on state of the target markings of the auxiliary measuring instrument to switch the radiance of target markings on and off in sync for the purpose of temporally successive target tracking and orientation determination by means of the target sensing unit.

11. A laser tracker for determining the position of an auxiliary measuring instrument that has a retroreflector and a multiplicity of target markings, and also for continuously tracking the auxiliary measuring instrument, wherein the target markings are arranged in a known fixed spatial distribution on the auxiliary measuring instrument and are embodied to emit or reflect light beams, and wherein the laser tracker comprises:
- a first radiation source for producing measurement radiation;
- a distance measuring module having distance measuring functionality; and
- a target sensing unit for determining an impingement point for radiation reflected by the retroreflector on a sensor of the target sensing unit and for producing an output signal in order to control a fine targeting functionality and a target tracking functionality, wherein the target sensing unit is configured to:
  - determine impingement points for light beams reflected or emitted by a multiplicity of target markings of the auxiliary measuring instrument on the sensor, and ascertain the spatial orientation of the auxiliary measuring instrument on the basis of the distribution of the impingement points of the light beams,
- wherein the target sensing unit has a target tracking mode and an orientation sensing mode, wherein the target sensing unit:
  - in the target tracking mode determines the impingement point of the reflected radiation on the sensor of the target sensing unit and to produce the output signal in order to control the fine targeting functionality and the target tracking functionality; and
  - in the orientation sensing mode determines the distribution of the impingement points of the light beams on the sensor of the target sensing unit and, on the basis thereof, to ascertain the spatial orientation of the auxiliary measuring instrument, wherein the orientation sensing mode comprises a measurement sequence with recording events that are triggered by an electronic shutter of the sensor,
- wherein the target sensing unit is in the target tracking mode as standard, and the orientation sensing mode can be dialed in under user control and lasts a stipulated period of time.

12. A laser tracker for determining the position of an auxiliary measuring instrument that has a retroreflector and a multiplicity of target markings, and also for continuously tracking the auxiliary measuring instrument, wherein the target markings are arranged in a known fixed spatial distribution on the auxiliary measuring instrument and are embodied to emit or reflect light beams, and wherein the laser tracker comprises:
- a first radiation source for producing measurement radiation;
- a distance measuring module having distance measuring functionality; and
- a target sensing unit for determining an impingement point for radiation reflected by the retroreflector on a sensor of the target sensing unit and for producing an output signal in order to control a fine targeting functionality and a target tracking functionality, wherein the target sensing unit is configured to:
  - determine impingement points for light beams reflected or emitted by a multiplicity of target markings of the auxiliary measuring instrument on the sensor, and ascertain the spatial orientation of the auxiliary measuring instrument on the basis of the distribution of the impingement points of the light beams, wherein the laser tracker has a joint input and output optical system for transmitting the measurement radiation, for admitting the reflected radiation and for admitting the light beams from the target markings, the laser tracker further comprising:

a second radiation source for producing a target tracking radiation, and beam deflection means for the essentially coaxial transmission of the measurement radiation and the target tracking radiation by the joint input and output optical system, wherein the measurement radiation and the target tracking radiation differ from one another, in terms of their polarity and/or wavelength, wherein:

the beam deflection means are of a nature such that a first portion of the reflected radiation can be directed onto the distance measuring module and a second portion of the reflected radiation can be directed onto the sensor of the target sensing unit, and/or provided upstream of the target sensing unit there is a filter that is essentially pervious to the target tracking radiation and that is essentially impervious to the measurement radiation.

13. A laser tracker system, having a laser tracker and an auxiliary measuring instrument that has a retroreflector and a multiplicity of target markings, wherein the target markings are arranged in a known fixed spatial distribution on the auxiliary measuring instrument, and are configured to emit or reflect light beams, wherein the laser tracker is built for determining the position of the auxiliary measuring instrument and also for continuously tracking the auxiliary measuring instrument, and wherein the laser tracker comprises:

a first radiation source for producing measurement radiation;

a distance measuring module having distance measuring functionality; and a target sensing unit for determining an impingement point for radiation reflected by the retroreflector on a sensor of the target sensing unit and for producing an output signal in order to control a fine targeting functionality and a target tracking functionality, wherein the target sensing unit is configured to:

determine impingement points for light beams reflected or emitted by a multiplicity of target markings of the auxiliary measuring instrument on the sensor, and ascertain the spatial orientation of the auxiliary measuring instrument on the basis of the distribution of the impingement points of the light beams, and wherein the laser tracker system furthermore has means for wireless communication between the laser tracker and the auxiliary measuring instrument in order to control an on state of the target markings, in order to switch the radiance of target markings on and off in sync for the purpose of temporally successive target tracking and orientation determination by means of the target sensing unit.

14. A laser tracker system, having a laser tracker and an auxiliary measuring instrument that has a retroreflector and a multiplicity of target markings, wherein the target markings are arranged in a known fixed spatial distribution on the auxiliary measuring instrument, and are configured to emit or reflect light beams, wherein the laser tracker is built for determining the position of the auxiliary measuring instrument and also for continuously tracking the auxiliary measuring instrument, and wherein the laser tracker comprises:

a first radiation source for producing measurement radiation;

a distance measuring module having distance measuring functionality; and a target sensing unit for determining an impingement point for radiation reflected by the retroreflector on a sensor of the target sensing unit and for producing an output signal in order to control a fine targeting functionality and a target tracking functionality, wherein the target sensing unit is configured to:

determine impingement points for light beams reflected or emitted by a multiplicity of target markings of the auxiliary measuring instrument on the sensor, and ascertain the spatial orientation of the auxiliary measuring instrument on the basis of the distribution of the impingement points of the light beams, and wherein the laser tracker system furthermore has means for wireless communication between the laser tracker and the auxiliary measuring instrument in order to control an on state of the target markings, in order to switch the radiance of target markings on and off in sync on the basis of a distance between the laser tracker and the auxiliary measuring instrument.

15. A method for determining the position of an auxiliary measuring instrument that has a retroreflector and a multiplicity of target markings, wherein the target markings are arranged in a known fixed spatial distribution on the auxiliary measuring instrument, and are embodied to emit or reflect light beams, the method comprising:

orienting a beam deflection unit of the laser tracker, which beam deflection unit emits radiation, to the auxiliary measuring instrument, transmitting radiation to the retroreflector in order to produce a reflected radiation, receiving the reflected radiation using a sensor of a target sensing unit, determining an impingement point for the reflected measurement radiation on the sensor, production an output signal in order to control a target tracking functionality, on the basis of the impingement point, receiving the reflected radiation using a distance measuring unit, determining a distance from the retroreflector, determining a direction to the retroreflector, and determining a spatial location of the auxiliary measuring instrument using light beams from the target markings, wherein receiving of light beams from the target markings using the sensor, wherein the spatial location of the auxiliary measuring instrument is determined by determining positions for the impingement points of the target markings on the sensor, wherein the reception of the reflected radiation using the sensor and the reception of the light beams take place sequentially, wherein the transmission of the radiation and transmission of light beams from the target markings take place alternately in a manner coordinated with one another.

16. The method according to claim 15, wherein the beam deflection unit is oriented to the auxiliary measuring instrument by means of a targeting functionality that is controlled by an output signal from a coarse targeting unit, wherein the method further comprises:

illuminating the auxiliary measuring instrument by illumination means of the coarse targeting unit in order to produce a reflection by the retroreflector,
receiving the reflection by the coarse targeting unit, and
coarse determining the position of the auxiliary measuring instrument on the basis of the reflection, and
producing the output signal in order to control the targeting functionality, on the basis of the coarse position of the auxiliary measuring instrument.

* * * * *